United States Patent
Hwang et al.

(10) Patent No.: US 9,161,098 B2
(45) Date of Patent: Oct. 13, 2015

(54) METHOD AND APPARATUS FOR REPORTING AUDIENCE MEASUREMENT IN CONTENT TRANSMISSION SYSTEM

(75) Inventors: Sung-Oh Hwang, Yongin-si (KR); Sergey Nikolayevich Seleznev, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 203 days.

(21) Appl. No.: 13/047,359

(22) Filed: Mar. 14, 2011

(65) Prior Publication Data

US 2011/0225422 A1 Sep. 15, 2011

(30) Foreign Application Priority Data

Mar. 12, 2010 (KR) .................... 10-2010-0022523

(51) Int. Cl.
| | | |
|---|---|---|
| *G06F 7/04* | (2006.01) | |
| *H04N 21/81* | (2011.01) | |
| *G06Q 30/02* | (2012.01) | |
| *H04N 21/254* | (2011.01) | |
| *H04N 21/418* | (2011.01) | |
| *H04N 21/442* | (2011.01) | |
| *H04N 21/658* | (2011.01) | |

(52) U.S. Cl.
CPC ......... *H04N 21/812* (2013.01); *G06Q 30/0201* (2013.01); *H04N 21/254* (2013.01); *H04N 21/4181* (2013.01); *H04N 21/44222* (2013.01); *H04N 21/6582* (2013.01)

(58) Field of Classification Search
CPC ....... H04L 63/08; H04L 63/0428; H04L 9/32; H04L 63/0853; H04N 7/1675; H04N 21/23476; G06F 21/34
USPC .......................... 713/168; 380/200; 726/27, 9
See application file for complete search history.

(56) References Cited

U.S. PATENT DOCUMENTS

| | | | |
|---|---|---|---|
| 6,222,924 B1 | 4/2001 | Salomaki | |
| 7,296,162 B2 | 11/2007 | Wajs | |
| 7,363,244 B2 * | 4/2008 | Staddon et al. .............. | 705/7.38 |
| 8,196,158 B2 * | 6/2012 | Lee et al. .......................... | 725/9 |
| 2005/0149974 A1 | 7/2005 | Norman | |
| 2007/0107022 A1 * | 5/2007 | Lawrence, III ................. | 725/92 |
| 2007/0136753 A1 | 6/2007 | Bovenschulte et al. | |

(Continued)

FOREIGN PATENT DOCUMENTS

| | | |
|---|---|---|
| JP | 2003-179565 | 6/2003 |
| JP | 2005-210311 | 8/2005 |

(Continued)

OTHER PUBLICATIONS

Japanese Office Action dated Nov. 4, 2014 issued in counterpart application No. 2014-096015.

*Primary Examiner* — Ali Abyaneh
(74) *Attorney, Agent, or Firm* — The Farrell Law Firm, P.C.

(57) ABSTRACT

A method and apparatus for reporting a consumption time of a service or content in Audience Measurement (AM), which measures a user consumption pattern of the service or the content is provided. A method for reporting a consumption time of the service or the content in a terminal of a content transmission system includes receiving an encryption key for encrypting the service or the content from a broadcasting server and transmitting a message requesting interpretation of the encryption key to a smart card. The message includes consumption time information of the service or the content.

10 Claims, 6 Drawing Sheets

(56) References Cited

U.S. PATENT DOCUMENTS

| | | |
|---|---|---|
| 2009/0254930 A1 | 10/2009 | Lo et al. |
| 2011/0110515 A1* | 5/2011 | Tidwell et al. ............... 380/200 |
| 2011/0203002 A1 | 8/2011 | Hwang et al. |
| 2012/0124605 A1* | 5/2012 | Praden ........................... 725/14 |

FOREIGN PATENT DOCUMENTS

| | | |
|---|---|---|
| JP | 2006-133959 | 5/2006 |
| KR | 1020040008896 | 1/2004 |
| WO | WO 2010/079185 | 7/2010 |

\* cited by examiner

Event Type

| Value | Description |
|---|---|
| 0x00 | Zapping |
| 0x01 | Terminating a parental rated service |
| 0x02 | AM allowed Service/Content |
| 0x03 | AM disallowed Service/Content |
| 0x04 - 0x7F | Reserved for future use |
| 0x80 - 0xFF | Reserved for specific event proprietary signalling (e.g. due to local regulations on parental control) |

Event Type Parameter

| | Value | Description |
|---|---|---|
| 301 | 0x00 | Key_Domain_ID ‖ SEK/PEK_ID in AM Allowed parameter for encrypted services |
| 302 | 0x01 | Any URI in AM Allowed parameter for unencrypted services |
| 303 | 0x02 | Absolute time for sending message |
| 304 | 0x03 | Accumulated Consumption Time for unencrypted services |
| | 0x04-0x7F | Reserved for future use |
| | 0x80-0xFF | Reserved for specific event proprietary signalling (e.g. due to local regulations on parental control) |

| Description | Value |
|---|---|
| User ID Tag | 0X13 |
| Length | L1 |
| User ID | Binary |
| Reporting data Tag | 0xC0 |
| Length | 3+L1+...+Ln |
| Reporting mode | Binary |
| Report ID | Binary Unsigned short |
| Zapping event [1] | Zapping event record |
| .... | |
| Zapping event [n] | Zapping event record |

602

| Description | Value |
|---|---|
| Record Format | Binary |
| Key Domain ID | Binary |
| Key group part | Binary |
| Service/Content ID (603) | String |
| Consumed time (604) | Binary |
| Duration | Binary |
| LAC_IN | Binary |
| Cell ID_IN | Binary |
| LAC_OUT | Binary |
| Cell_ID_OUT | Binary |

FIG.6

METHOD AND APPARATUS FOR REPORTING AUDIENCE MEASUREMENT IN CONTENT TRANSMISSION SYSTEM

PRIORITY

This application claims priority under 35 U.S.C. §119(a) to a Korean Patent Application filed in the Korean Intellectual Property Office on Mar. 12, 2010 and assigned Serial No. 10-2010-0022523, the entire disclosure of which is incorporated herein by reference.

BACKGROUND OF THE INVENTION

1. Field of the Invention

The present invention relates generally to a content transmission system, and more particularly, to an apparatus and method for providing an additional service such as a next-generation user-customized service by analyzing a user content consumption pattern.

2. Description of the Related Art

The mobile communication market is continuously requested to produce new services by recombining or integrating existing technologies. In line with the recent development of communication and broadcasting technologies, conventional broadcasting systems or mobile communication systems can now provide next-generation user-customized services through portable terminals, such as cellular phones, Personal Digital Assistants (PDAs), and the like (terminals).

It is expected that a service for measuring a user consumption pattern and providing content or advertisements suitable for a user's tastes will be widely used in a broadcasting service or a content providing service as one of the next-generation user-customized services. A basic function of the service is Audience Measurement (AM). The basic function of AM records what services are consumed by a user, when the user consumes services, where the user consumes the services, how long the user consumes the services, and how the user consumes the services. The operation of AM includes AM command delivery, AM execution, and AM execution result reporting. AM data may be stored in a device for consuming content or a server managed by a service provider. The AM may be stored directly by an operator for operating a content transmission service or a third AM related operator on a network. Thus, terminals or smart cards for executing AM should be able to transmit an AM execution result report to an address of a server indicated by an AM command.

As mentioned above, AM may be implemented directly in a terminal or in a smart card connected to such terminal. When AM is implemented directly in a terminal, a timer or an embedded watch in the terminal may directly measure the consumption time of a service and content. On the other hand, when the AM function is embedded in a smart card, the consumption time of the service and the content cannot be directly measured. During the consumption of services or content, smart cards have been introduced in order to ensure the proper user has access and a service/content transmission path and a content protection function of preventing illegal use of content. In the service protection function, the smart card stores decryption keys for decrypting content and services encrypted through service protection and delivers the decryption keys to a terminal at the request of the terminal when the terminal tries to decrypt the encrypted content and services, thereby allowing the content and services to be decrypted and available to the user. The smart card having the embedded AM function uses a method of estimating a consumption time of content and a service by using a message which requests delivery of a decryption key for decrypting the content and the service when the terminal needs the decryption key.

In the foregoing conventional technique, when an AM server is managed by the same operator managing a server for providing the service protection function, a consumption time of a service or content can be estimated by using a frequency of a message used for a terminal to request a smart card to deliver a decryption key. However, when the AM server is managed by a third operator, there is no way for a smart card with an embedded AM function to report a consumption time of a service and content. Therefore, there is a need for a scheme capable of reporting a consumption time of a service and content in the smart card having an embedded AM function therein.

SUMMARY OF THE INVENTION

Accordingly, an aspect of the present invention is to provide a method and apparatus for reporting a consumption time of a service or content in AM for measuring a user consumption pattern of the service or the content.

Another aspect of the present invention is to provide a method and apparatus for reporting a consumption time of a service or content when a smart card, which is separate from a terminal, such as a Subscriber Identity Module (SIM) card, is used for AM.

According to an aspect of the present invention, a method for reporting a consumption time of a service or content in a terminal of a content transmission system is provided. The method includes receiving an encryption key for encrypting a service or content from a broadcasting server and transmitting a message to a smart card requesting the smart card to interpret the encryption key. The message includes consumption time information of the service or the content.

According to another aspect of the present invention, an apparatus for reporting a consumption time of a service and content in a terminal of a content transmission system is provided. The apparatus includes a receiver for receiving an encryption key for encrypting a service or content from a broadcasting server, a time information generator for generating consumption time information of the service or the content, and a first communicator for transmitting to a smart card a request for the smart card to interpret the encryption key.

According to another aspect of the present invention, a method for reporting a consumption time of a service or content in a smart card which is separate from a terminal in a content transmission system is provided. The method includes receiving a message requesting interpretation of an encryption key from the terminal, the message including consumption time information of a service or content, generating an AM result by using the consumption time information, and transmitting the generated AM result to a broadcasting server.

According to another aspect of the present invention, an apparatus for reporting a consumption time of a service or content in a smart card which is separate from a terminal, in a content transmission system is provided. The apparatus includes a second communicator for receiving a message requesting interpretation of an encryption key from the terminal, the message including consumption time information of a service or content and an Audience Measurement (AM) module for generating an AM result by using the consumption time information and transmitting the generated AM result to a broadcasting server.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 3 illustrates an event message indicating a consumption time of a service or content according to an embodiment of the present invention;

FIG. 6 is a structural diagram of an AM result report message according to an embodiment of the present invention.

DETAILED DESCRIPTION OF THE EMBODIMENTS OF THE PRESENT INVENTION

Figure 1:
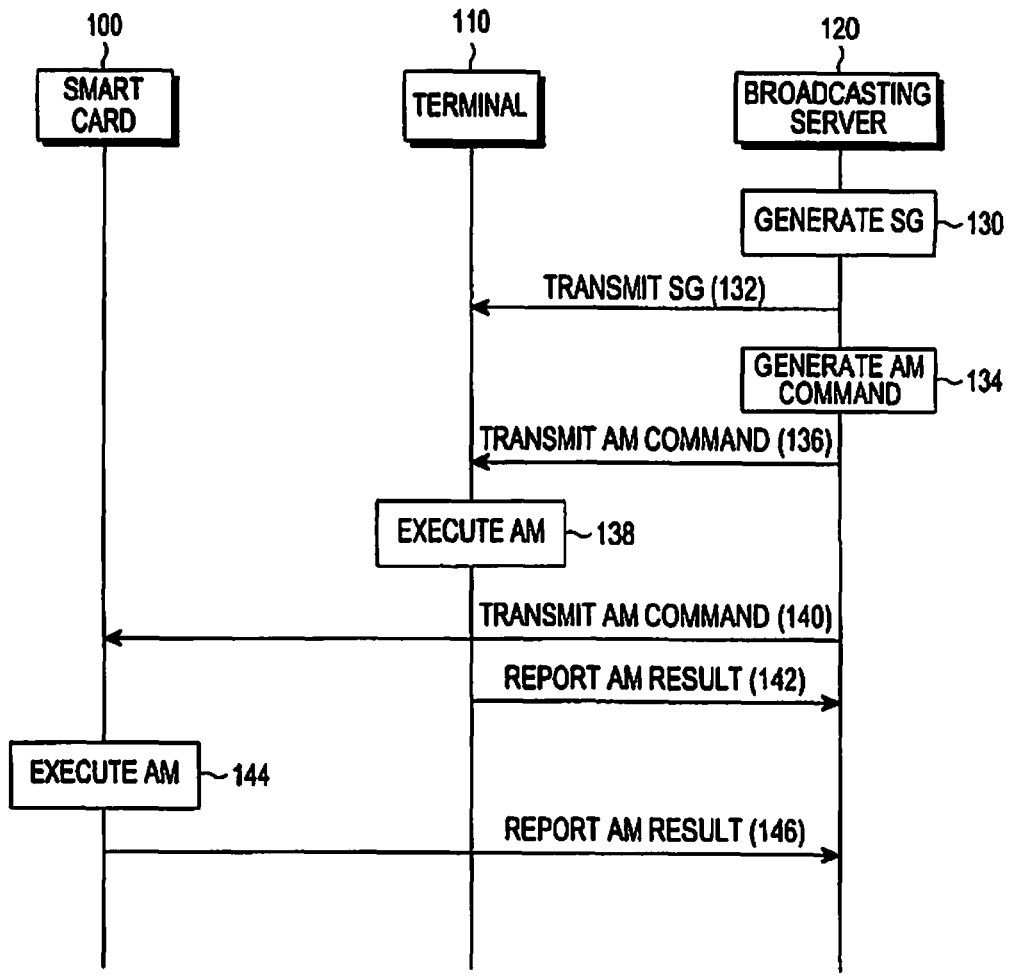
FIG. 1 a signal flow diagram of a conventional AM reporting method.

Hereinafter, various embodiments of the present invention will be described in detail with reference to the accompanying drawings. It should be noted that throughout the drawings, like reference numerals refer to like components.

In the following description, some detail is provided to help with the overall understanding of the present invention, and it will be obvious to those having ordinary skill in the art that the present invention can be made without such details. In the following description, a detailed description of known functions or configurations incorporated herein will be omitted when it may obscure the subject matter of the present invention.

In the following description, names of entities defined in the Open Mobile Alliance Mobile Broadcast Service (OMA BCAST), a standards group for applications of mobile terminals, will be used for convenience, but these are not to limit the scope of the present invention, and the present invention can be applied to any system having a similar technical background. Thus, the present invention can be applied to not only various broadcasting systems but also various content transmission systems. An Audience Management (AM) server may be a server belonging to an operator for operating a broadcasting service or a server operated by a third operator.

FIG. 1 a signal flow diagram of a conventional AM reporting method.

In FIG. 1, steps unnecessary to describe an operation of AM have been omitted.

A broadcasting server 120, which is a server for providing a broadcasting service, may include a BCAST Service Distribution/Adaptation (BSD/A) and for generating and transmitting a Service Guide (SG) and a BCAST Subscription Management (BSM) for executing functions such as subscription management, security, AM management, and the like.

The broadcasting server 120 generates an SG in step 130. The SG provides a description of a service and content, a method for receiving the service and the content, and information regarding time and security. The broadcasting server 120 transmits the SG generated in step 130 to a terminal 110 via a broadcasting network or an interactive network in step 132. The broadcasting server 120 then generates a command for AM in step 134. The AM command may include a measurement range, the number of reports, and the like. The broadcasting server 120 transmits the generated AM command to the terminal 110 in step 136. In step 136, the AM command may be transmitted via a broadcasting network or an interactive network. The broadcasting network, which is a network for transmitting a broadcasting service, may be, for example, a Digital Video Broadcasting-Handheld (DVB-H) network, a Multimedia Broadcast Multicast Service (MBMS) network of the $3^{rd}$ Generation Partnership Project (3GPP), a Broadcast and Multicast Service (BCMCS) network of the $3^{rd}$ Generation Partnership Project 2 (3GPP2), or the like. The interactive network is a network for transmitting a broadcasting service in one-to-one communications or interactively exchanging control information and additional information related to broadcasting service reception, and may be, for example, a cellular network.

The transmission may be performed using a BCAST notification message, a Short Message Service (SMS) message, or a separate message. The AM command may be transmitted prior to the transmission of the SG, but in the present invention, is assumed to be transmitted after the transmission of the SG. According to a location in which AM is implemented, the broadcasting server 120 may transmit the AM command to a smart card 100. The smart card 100, which is an entity providing a security solution for a broadcasting service, may be a Universal Subscriber Identity Module (USIM) or software or hardware similar to the USIM. AM execution of step 138 and AM execution of step 144 are different in that they are performed by the terminal 110 and the smart card 100, respectively, but both of them involve a basic AM operation regarding who consumes which service and where and how long the service is consumed is executed. The result is reported to the broadcasting server 120 through transmission of an AM result report in step 142 or transmission of an AM result report in step 146. In step 142 or step 146, the AM result report may be transmitted to a third server, i.e., an AM server, other than the broadcasting server 120. In this case, an address of the third server may be provided through the AM command transmitted in step 136 or an AM command transmitted in step 140. When the AM result report is transmitted to the third server, rather than the broadcasting server 120, as in step 142 or step 146, there is no way for the smart card 100 to report a consumption time of a service and content. An embodiment of the present invention includes a method and apparatus for reporting a consumption time of a service and content when an AM result report is transmitted to a third server instead of the broadcasting server 120.

Figure 2:
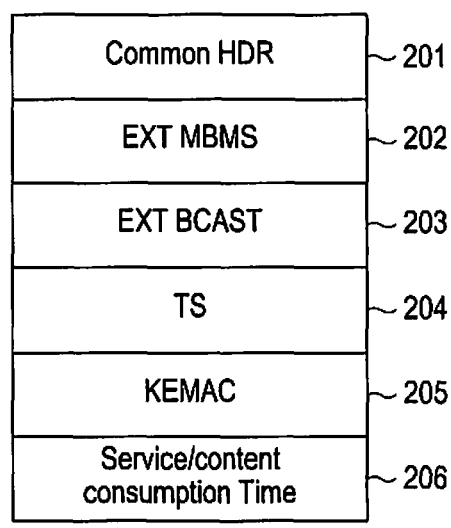
FIG. 2 illustrates a Short Term Key Message (STKM) indicating a consumption time of a service or content according to an embodiment of the present invention.

FIG. 2 illustrates a Short Term Key Message (STKM) of indicating a consumption time of a service or content according to a embodiment of the present invention.

In FIG. 2, field 206 indicates the use of content and a service is added to a Multimedia Internet KEYing (MIKEY) message exchanged between the terminal and the smart card.

The STKM using the MIKEY message is transmitted from the broadcasting server to the terminal that transmits the STKM to the smart card to known data encrypted in and transmitted through the STKM. The smart card decrypts the STKM received from the terminal by using a decryption key stored therein and then transmits information required by the terminal. MIKEY is a standard for prescribing a format of a message for transmitting an encryption key for multimedia content defined by the Internet Engineering Task Force (IETF), and MIKEY used in the OMA BCAST is defined in Request For Comments (RFC) 5410. In the present invention, a description of MIKEY is unnecessary and will be omitted.

Referring to FIG. 2, a field 201 is a common header of an MIKEY message and indicates information such as a protocol version, as is described in detail in RFC 3830.

A field 202 is an extension field used in an MBMS for broadcasting service transmission in the 3GPP.

A field 203 is an extension field used in the OMA BCAST, and a Time Stamp (TS) field 204 and a KEMAC field 205, which is a payload field, will not be described because it is not relevant to the present invention, but are described in detail in OMA-TS-BCAST-SvcCntProtection.

A service/content consumption time field 206 is a field included in the present invention and is added to the end of the MIKEY message for transmission when the terminal requests the smart card to interpret an STKM for a particular service or content. A value of the service/content consumption time field 206 is a time value of a clock embedded in the terminal or a time value that is known through a signal acquired from outside the terminal (e.g., a protocol used to indicate a time of a server in a Global Positioning System (GPS) network or a Network Time Protocol (NTP) network). The service/content consumption time field 206 may have various values as described below.

TABLE 1

| Meaning of Service/Content Consumption Time | | Value |
|---|---|---|
| At Initial Transmission | Indicating start of consumption of service/content | Time value provided by terminal or time value using signals (GPS and NTP) provided from the outside. Time value at STKM transmission. |
| After Initial Transmission | Indicating continuation of consumption of service/content | Time value provided by terminal or time value using signals (GPS and NTP) provided from outside. Time value at STKM transmission or accumulated time value after initial STKM transmission. |
| At Last Transmission | Indicating end of consumption of service/content | Time value at STKM transmission or accumulated time value after initial STKM transmission. |

In Table 1, the value of the service/content consumption time field 206 after initial transmission may be an absolute time value or an accumulated time value as shown in Table 1. When the service/content consumption time field 206 has an absolute time value, the smart card may calculate a value acquired by subtracting a value of the service/content consumption time field 206 of an initial STKM message from a value of the service/content consumption time field 206 of a last STKM message as a consumption time of a service or content corresponding to the STKM message.

The service/content consumption time field 206 may be transmitted through the OMA BCAST extension field 203, and also in this case, have the same structure and value as those described above.

FIG. 3 illustrates an event message indicating a consumption time of a service or content according to an embodiment of the present invention.

In FIG. 3, a new message is added to an event message used to transmit data regarding a particular event between the terminal and the smart card, such that the terminal informs the smart card of a consumption time of a service or content.

The event message is a message exchanged between the smart card and the terminal upon the occurrence of a particular event. Conventionally, the event message is used to notify regarding the occurrence of zapping of a service or content or notify whether to allow AM for parental control and clear-to-air services. Conventionally, a value regarding an event of an AM-allowed service/content is an identifier of the service or content; an identifier of an encrypted service or content is Key_DomainId||Service Encryption Key (SEK)/(Program Encryption Key (PEK)_ID corresponding to the service or content and an identifier of a non-encrypted service or content is an identifier of the service or content provided by an SG for providing information about the service or content. However, in the present invention, to transmit consumption time information regarding a service or content, fields 301, 302, 303, and 304 shown in FIG. 3 are included. Prior to the description of the second embodiment of the present invention, an event may have a plurality of values related to it and a detailed description thereof is provided in the OMA-BCAST-TS-Svc-ConProtection and will be omitted herein.

Referring to FIG. 3, field 301 has a value which is an identifier for an encrypted service or content, such that a service or content corresponding to key information is identified with Key_DomainId||SEK/PEK_ID as in the current BCAST standard.

The field 302 contains a value that is an identifier for a non-encrypted service or content and is provided by a service fragment or a content fragment of a BCAST SG.

In addition to the identifier of the field 301 and the identifier of the field 302 provided by the service fragment or the content fragment, any identifier may be used if it can clearly identify a service and content between the smart card and the terminal. While anyURI is included as the identifier of the service or content herein, the identifier may be in a string format or other data format.

Field 303 has a value that is a time at the transmission of the event message and may be time information provided by the terminal or time information that can be acquired from outside such as a GPS or NTP network. By using the value of field 303, the smart card can calculate a consumption time of a service or content as described in Table 1.

The field 304 contains a value that is an accumulated consumption time of a service or content and can be used as described in Table 1.

The transmission of a consumption time of a particular service will be described with reference to Table 1 and FIG. 3. A tag, a length, and a value of an event message are indicated first, and then a type parameter for the event message is defined. If a service consumption start time for a particular service A is 00:00:00, then the event message may be expressed as {0x01||A0x02||00:00:00}. "0x01" and "0x02" indicate fields 301 and 302, respectively, of FIG. 3, and subsequent values are values for their respective fields. The "||" means that the values are concatenated. The "||" may also be represented by "+".

Figure 4:
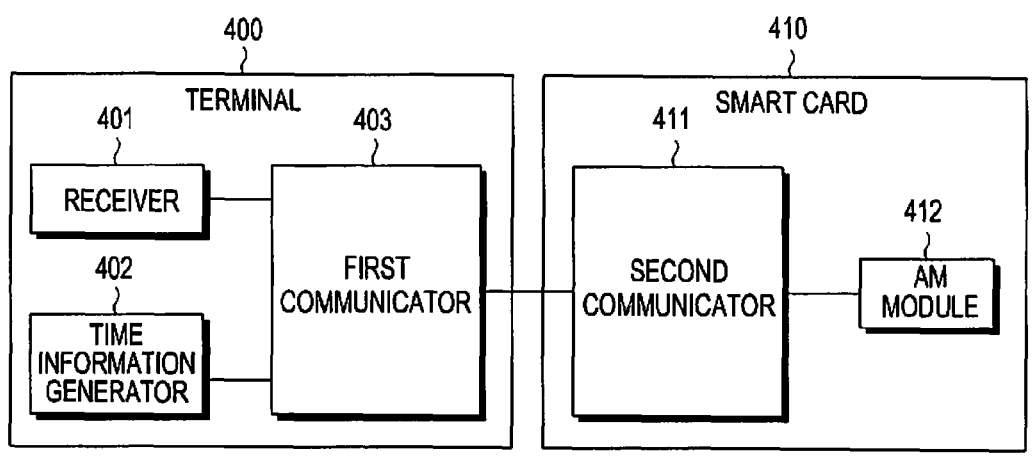
FIG. 4 illustrates block diagrams of a terminal and a smart card according to an embodiment of the present invention.

FIG. 4 shows block diagrams of a terminal and a smart card according to an embodiment of the present invention.

A terminal 400 may include a receiver 401, a time information generator 402, and a first communicator 403.

A smart card 410 may include a second communicator 411 and an AM module 412. Functions of the terminal 400 and the smart card 410, which are not relevant to the present invention, will not be described herein.

The receiver 401 receives an SG necessary for reception of a BCAST service, a broadcasting service, security information necessary for reception of the broadcasting service, and an STKM message.

The time information generator 402 provides time information for measuring a consumption time of a service or content, which is included in the present invention, and generates the time information by using time information provided in the terminal 400 or an external signal acquired from a GPS or an external signal such as a NTP signal provided from a network. The first communicator 403 manages communication between the smart card 410 and the terminal 400. The first communicator 403 generates the STKM message as shown in FIG. 2 according to the first embodiment and the event message as shown in FIG. 3 according to the second embodiment, and transmits the generated message to the smart card 410. The first communicator 403, when generating the STKM message as shown in FIG. 2 or the event message as shown in FIG. 3, queries the time information generator 402 as to the current time to add current time information to the messages or to calculate an accumulated consumption time of a service or content and add the calculated time to the messages.

The second communicator 411 receives the STKM message or the event message from the first communicator 403 and transmits the received message to the AM module 412. The AM module 412 is a module that handles all AM related operations, such as an AM configuration operation, an AM execution operation, an AM result reporting operation, and the like in smart-based AM. The AM module 412 records a consumption time of a service or content in an AM result report by using time information transmitted through the STKM message in the first embodiment or time information transmitted through the event message in the second embodiment, and transmits the AM result report to an AM server. The AM server may be a server that belongs to an operator for operating BCAST services or a server operated by a third operator.

Figure 5:
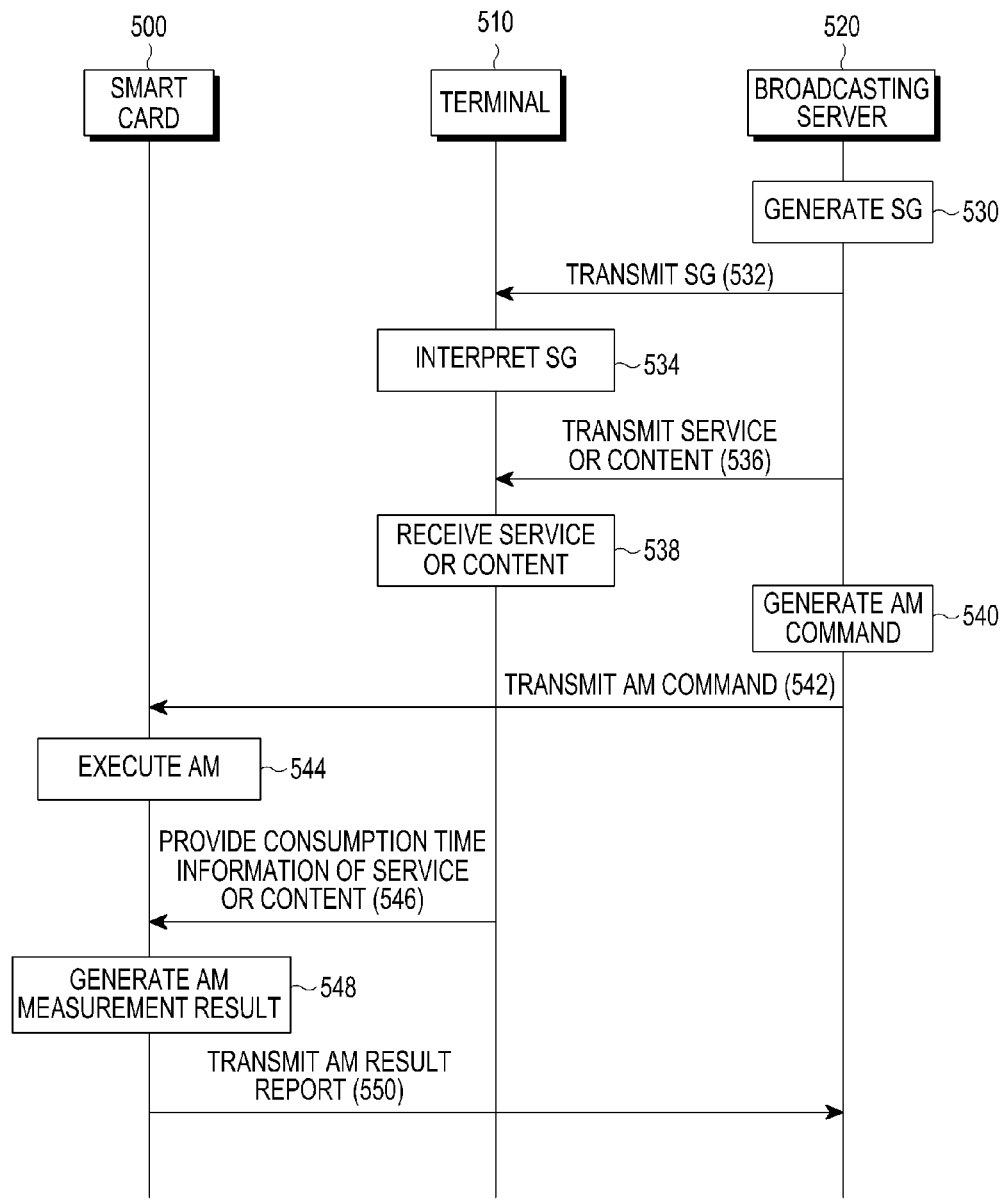
FIG. 5 illustrates an AM reporting method according to an embodiment of the present invention.

FIG. 5 is a flowchart showing an AM reporting method according to an embodiment of the present invention.

Referring to FIG. 5, in step 530, a broadcasting server 520 generates an SG including information about a service or content, reception information regarding the service or content, schedule information, and so forth, and transmits the generated SG to a terminal 510 in step 532. The terminal 510, after receiving the SG, interprets the received SG in step 534 in order to acquire the reception information regarding the service or content. The broadcasting server 520 transmits the service or content in step 536 to the terminal, and the terminal 510 receives the service or content in step 538. The broadcasting server 520 then generates an AM command to be transmitted to a smart card 500 in step 540, and transmits the generated AM command to the smart card 500 in step 542. The AM command may be transmitted to the smart card 500 at an arbitrary time that is prior to reception of the service. However, in FIG. 5, the AM command is transmitted after transmission of the service or content. The AM execution message may be transmitted directly from the broadcasting server 520, or the smart card 500 may download the AM command from a server indicated by the broadcasting server 520 through the terminal 510. Information about the server may be provided at the time of subscription to an AM service or may be incorporated in the smart card 500. The smart card 500 executes AM according to the transmitted AM command in step 544, is provided with consumption time information of the service or content in step 546, and generates an AM measurement result by using the consumption time information in step 548. The AM measurement result may include a name of the service or content, a location where the service or content is consumed, a subject of the consumption, and a consumption time, and to generate the consumption time information, the messages included in FIGS. 2 and 3 are used. Terminal 510 transmits an AM result report including the AM measurement result generated in step 548 to the broadcasting server 520 in step 550. Although not shown in FIG. 5, the AM result report including the AM measurement result generated in step 548 may be transmitted to a third server indicated by the AM command. In other words, it should be possible for the AM result report to be transmitted to an address of a server indicated by the AM command.

FIG. 6 illustrates an AM result report message according to an embodiment of the present invention.

Referring to FIG. 6, the AM result report message is an example of the AM result report transmitted in step 550 of FIG. 5, and may include consumption time information of a service or content acquired by a method included in the present invention.

Message 601 is an example of a message for reporting the AM measurement result from the smart card 500 of FIG. 5 to the broadcasting server 520 of FIG. 5, and is described in detail in the OMA-BCAST-TS-Service, and the actual measurement result is reported through a zapping event of the message 601. Message 602 is an example of the zapping event. According to the method included in the present invention, an actual consumption time of a service or content is recorded in and reported through a service/content ID 603 and a consumed time 604, and for encrypted content and service, a key domain ID and a key group part may be used as an ID of the service or content.

As can be understood from the foregoing description, in AM based on a smart card, an AM server for receiving an AM result report can recognize a consumption time of a service or content, regardless of an entity for managing the AM server.

Additionally, according to an embodiment of the present invention, in an AM which measures a user consumption pattern of a service or content, a consumption time of the service or content can be efficiently reported.

Further, according to an embodiment of the present invention, when a smart card, such as an SIM card, which is separate from a terminal, is used, a consumption time of a service or content can be reported.

While the present invention has been described in detail, embodiments mentioned in the course of description are merely illustrative rather than restrictive and changes in components that can be substituted in the present invention also fall within the scope of the present invention, without departing from the technical spirit and scope of the invention as provided in the accompanying claims and their equivalents.

What is claimed is:

1. A method for audience measurement (AM) in a terminal, the method comprising:
    transmitting, by the terminal, to a smartcard, an AM message for at least one of a service and a content,
    wherein the AM message includes at least one parameter based on an event type, for reporting consumption time of the at least one of the service and the content,
    wherein the event type includes a type for indicating an AM allowed service and/or an AM allowed content;
    receiving an AM result generated based on the AM message from the smartcard; and
    transmitting a reporting message including the AM result for at least one of the service and the content to a server,
    wherein the at least one parameter based on the event type comprises:
        an identifier of the at least one of the service and the content;
        an accumulated time of the at least one of the service and the content; and
        an absolute time of the at least one of the service and the content.

2. The method of claim 1, wherein the event type includes a type for indicating an AM disallowed service/content.

3. A method for audience measurement (AM) in a smartcard, the method comprising:
 receiving, by the smartcard, from a terminal, an AM message for at least one of a service and a content, wherein the AM message includes at least one parameter based on an event type, for reporting consumption time of the at least one of the service and the content,
 wherein the event type includes a type for indicating an AM allowed service and/ or an AM allowed content, and
 wherein the at least one parameter based on the event type comprises:
  an identifier of the at least one of the service and the content;
  an accumulated time of the at least one of the service and the content; and
  an absolute time of the at least one of the service and the content
 generating, by the smartcard, an AM result based on the AM message; and
 transmitting, by the smartcard, to a server, a reporting message including the AM result for the at least one of the service and the content.

4. The method of claim 3, wherein the event type includes a type for indicating an AM disallowed service/content.

5. The method of claim 3, wherein the reporting message is transmitted via a short message service (SMS) message.

6. An apparatus for audience measurement (AM) in a terminal, the apparatus comprising:
 a communicator configured to transmit, to a smartcard, an AM message for at least one of a service and a content, receive an AM result generated based on the AM message from the smartcard, and transmit a reporting message including the AM result for at least one of the service and the content to a server,
 wherein the AM message includes at least one parameter based on an event type, for reporting consumption time of the at least one of the service and the content,
 wherein the event type includes a type for indicating an AM allowed service and/or an AM allowed content, and
 wherein the at least one parameter based on the event type comprises:
  an identifier of the at least one of the service and the content;
  an accumulated time of the at least one of the service and the content; and
  an absolute time of the at least one of the service and the content.

7. The apparatus of claim 6, wherein the event type includes a type for indicating an AM disallowed service/content.

8. An apparatus for audience measurement (AM) in a smartcard, the apparatus comprising:
 a receiver of the smartcard configured to receive an AM message, from a terminal, for at least one of a service and a content,
 wherein the AM message includes at least one parameter based on an event type, for reporting consumption time of the at least one of the service and the content,
 wherein the event type includes a type for indicating an AM allowed service and/ or an AM allowed content, and
 wherein the at least one parameter based on the event type comprises:
  an identifier of the at least one of the service and the content;
  an accumulated time of the at least one of the service and the content; and
  an absolute time of the at least one of the service and the content; and
 an AM module of the smartcard configured to generate an AM result based on the AM message, and transmit, to a server, a reporting message including the AM result for the at least one of the service and the content.

9. The apparatus of claim 8, wherein the event type includes a type for indicating an AM disallowed service/content.

10. The apparatus of claim 8, wherein the reporting message is transmitted via a short message service (SMS) message.

* * * * *